United States Patent Office

3,429,657
Patented Feb. 25, 1969

---

3,429,657
METHOD FOR RECOVERING AND PRODUCING POTASSIUM SALTS
D'Arcy R. George, James M. Riley, and J. Richard Ross, Salt Lake City, Utah, assignors to the United States of America as represented by the Secretary of the Interior
No Drawing. Filed Sept. 2, 1966, Ser. No. 577,085
U.S. Cl. 23—63                                        9 Claims
Int. Cl. C01d *3/14, 5/00, 9/02*

---

ABSTRACT OF THE DISCLOSURE

A potassium-bearing brine is contacted with $NaClO_4$ to precipitate $KClO_4$ which is then separated and formed into solution. The potassium in the solution is ion exchanged with sodium, after which the resultant free potassium is combined with chloride, sulfate, nitrate or carbonate ion.

---

This invention relates to the recovery and production of potassium salts from solutions.

In the processing of natural brines or brines prepared from mineral salts containing NaCl, KCl and $MgCl_2$, the potassium may be readily recovered as KCl substantially free of sodium or magnesium by simple fractional crystallization, including solar evaporation. However, if such brines contain sulfate, which is commonly present as $Na_2SO_4$, the fractional crystallization procedures become complex, and at high sulfate concentrations the potassium can be recovered only as relatively valueless double sulfates of sodium or magnesium. If such brines could be desulfated, fractional crystallization or other techniques could be easily applied to the residue chlorides. However, the various proposed desulfating methods have been either ineffective or economically impractical.

It has now been discovered that potassium salts can be economically recovered and produced from potassium-bearing brines and other complex solutions by (1) precipitating potassium as $KClO_4$ by the addition of $NaClO_4$ to a brine, (2) recovering the precipitated $KClO_4$, (3) forming a solution of the $KClO_4$, (4) contacting the $KClO_4$ solution with an ion exchange resin to separate potassium ion from perchlorate ion, and (5) combining the potassium ion with a selected anion to form a solution from which a desired potassium salt can be recovered by conventional evaporation techniques.

It is therefore an object of the present invention to provide an alternative manner to desulfating for recovering potassium salts from brines containing high sulfate concentrations. Another object of the invention is to selectively and economically recover valuable potassium salts from complex solutions. A further object is to selectively, chemically precipitate a potassium salt from complex solutions and to produce potassium chloride or other salable potassium salts therefrom. A still further object is to precipitate the potassium salt from solution with a reagent that is low in cost and is recoverable with high efficiency. A still further object is to precipitate the potassium salt from brines in a form which is readily convertible to high-grade KCl or other salable potassium salts by using low-cost chemicals, preferably chemicals contained in the brines themselves.

Other objects and advantages will be obvious from the detailed description of the process appearing in the specification taken in conjunction with the following flow diagram in which the overall potassium recovery and production procedure is shown.

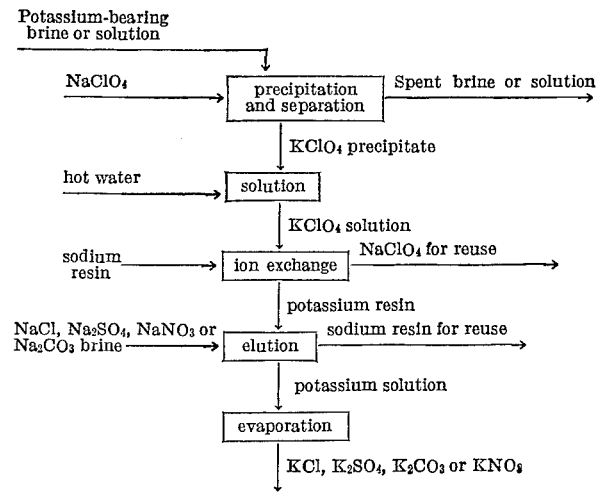

In accordance with the invention, a complex brine containing Na, K, Mg, Cl, and $SO_4$ is treated with a solution of $NaClO_4$, whereby the potassium is precipitated as $KClO_4$. Since the completeness of $KClO_4$ precipitation is in part dependent on temperature, it is, therefore, desirable to chill the brine prior to treatment with $NaClO_4$. A brine temperature of from about $-10°$ to about $0°$ C. is preferable. If the brine is not chilled, $NaClO_4$ in excess of stoichiometric requirements will be required because the $KClO_4$ is fairly soluble in brine, at room temperature, in the absence of excess perchlorate. At low brine temperatures (e.g., $-10°$ to $0°$ C.) a stoichiometric amount of $NaClO_4$ results in high potassium recovery, although an excess is conducive to even a higher recovery. For a brine containing potassium in the range of 15 to 60 grams per liter, recovery of perchlorate and potassium with stoichiometric additions of $NaClO_4$ at $-10°$ to $0°$ C. may be expected to range from about 87 to 97 percent. When using an excess of perchlorate, most of the excess left in the waste brine can be recovered therefrom by (1) solvent extraction with a tertiary or quaternary alkyl amine followed by stripping with cold, potassium-bearing brine or a solution of NaCl and $Na_2CO_3$ or (2) adsorption of perchlorate from spent brine on anion exchange resins followed by elution with fresh, cold, potassium-bearing brine.

Following precipitation of $KClO_4$, the precipitate is recovered by settling, filtration, or centrifuging, washed with a small volume of cold water saturated with $KClO_4$, and then dissolved in hot water. Solubilities in the order of 140 to 200 grams per liter are obtainable in the temperature range of 80° to 100° C. The hot solution is then passed through a loading column containing a bed of the sodium form of a cation exchange resin of the nuclear sulfonic type, moving countercurrent to the flow of $KClO_4$ solution. The effluent from this operation is a solution of $NaClO_4$, substantailly free of potassium and suitable for recycle to the precipitation step. Under proper operating conditions with respect to resin and solution flowrates, all of the sodium on the resin is displaced by potassium. Alternatively, an anion exchange resin could be employed whereby the $KClO_4$ is directly converted to the desired salt solution, but eocnomics and reaction kinetics favor the use of cation exchange resins.

Following conversion of the resin to the potassium form, the resin is transferred to an elution column in which the resin is moved continuously, countercurrent to a flow of NaCl brine. Again, under proper operating conditions with respect to NaCl brine concentration, and brine and resin flowrates, a substantially sodium-free KCl brine is obtained. Effluent concentrations of up to about 200 grams of KCl per liter with only 1 to 2 grams of NaCl per liter can be achieved. If desired, a solution of $Na_2SO_4$, $Na_2CO_3$, or $NaNO_3$ may be substituted for the NaCl brine, in which case the potassium effluent is a solution of the corresponding anion. Hence, whichever salt offers the best market could be produced in the same equipment.

Final recovery of the potassium salt is achieved by simple evaporation in multiple effect evaporators, by spray drying, or other suitable means.

The following example illustrates the effectiveness of the process:

Example (1) Fifteen liters of a waste bittern taken from a Great Salt Lake processing plant and containing in grams per liter: 16 K, 27 Mg, 80 Na, 175 Cl⁻, and 60 $SO_4$= were cooled to —5° C. As a result of chilling, about half the sulfate was precipitated as hydrated sodium sulfate, while the potassium and magnesium content remained the same. The crystallized sodium sulfate was removed by filtration and a slightly less than stoichiometric amount of sodium perchlorate was then added to the bold bittern. The resultant solution was mechanically stirred for approximately 30 minutes and the potassium perchlorate then allowed to settle. This latter operation was conducted at low temperaures of about —10° to 0° C. The settled potassium perchlorate was subsequently filtered, washed, and dried, and the products of the test were assayed. The barren brine contained 2.1 grams of $ClO_4^-$ and 3.28 grams of K per liter indicating that 80 percent of the potassium had been removed while 6 percent of the perchlorate was lost to the brine. These values are in good agreement with the experimentally determined solubility product of $KClO_4$, which is about $16 \times 10^{-4}$ mole per liter at —10° C. in a brine of this composition. The $KClO_4$ precipitate, after washing and drying, assayed in excess of 99 percent $KClO_4$ and contained only 0.02 percent Na.

(2) The $KClO_4$ precipitate was dissolved in water at 70° to 80° C. establish a 0.7 M concentration, and was passed through a fixed bed type cation exchange resin bed which had been converted to the sodium by treatment with NaCl brine. Saturation loadings of 1.9 to 2.1 equivalents or 75 to 85 grams of potassium were consistently obtained. Resin loadings to the first appearance of potassium in the effluent ranged from 20 to 40 grams per liter, which showed that with multiple, fixed bed ion exchange columns or a countercurrent column, a $NaClO_4$ solution substantially free of potassium could be produced for recycle on a continuous basis.

(3) Elution of potassium from loaded resin was obtained by passing solutions of NaCl, $Na_2CO_3$ and $Na_2SO_4$ through a fixed bed of loaded resin at temperatures of 25° C. to 75° C. and solution flowrates equivalent to retention times of 10 to 20 minutes. Solution strengths ranged from 2 to 3 M. Sampling of the eluate in small increments showed that depending upon the influent concentration of NaCl, $Na_2SO_4$, or $Na_2CO_3$, peak concentrations of 2 to 3 moles of potassium were obtained, with accompanying sodium concentrations of only 0.2 to 0.5 gram per liter. There were only minor differences in elution efficiency between NaCl $Na_2CO_3$, and $Na_2SO_4$. In further tests with a 2 inch diameter by 10 feet high continuous countercurrent ion exchange column, resin in the potassium form was continuously eluted with NaCl solutions of different concentrations and yielded effluents containing 135 to 190 grams of KCl and 5 to 7 grams of NaCl per liter. Evaporation of these solutions and simple fractional crystallization yielded products containing in excess of 99 percent KCl.

In the process of the present invention, by employing sodium perchlorate as the precipitant, reagent costs are maintained comparatively low and reagent can be easily recovered for reuse. Furthermore, the perchlorate possesses a high selectivity for potassium and forms a substantially insoluble salt therewith in cold brines. However, the key to the use of perchlorate is the comparatively easy conversion of a solution of $KClO_4$ to $NaClO_4$ by ion exchange.

Although the particular process is well adapted to carry out the objects of the present invention, it is to be understood that various modifications and changes may be made all coming within the scope of the following claims.

What is claimed is:

1. A process for producing a potassium salt product from a potassium salt-bearing solution, said potassium salt product selected from the group consisting of potassium chloride, sulfate, carbonate and nitrate, comprising
    (a) adding $NaClO_4$ to said solution in sufficient quantity to precipitate potassium from said solution as $KClO_4$;
    (b) separating said $KClO_4$ precipitate from remaining solution and forming a $KClO_4$ solution;
    (c) ion exchanging the potassium ion of said $KClO_4$ solution with sodium ion by means of an ion exchange resin to separate potassium ion from perchlorate ion; and
    (d) combining said potassium ion with an anion selected from the group consisting of chloride, sulfate, carbonate and nitrate by ion exchange.

2. The process of claim 1 wherein said potassium-bearing salt solution is maintained in a chilled condition during said precipitation step.

3. The process of claim 2 wherein said salt solution is maintained at a temperature of about —10° to about 0° C. during said precipitation step.

4. The process of claim 1 wherein said ion exchange resin is the sodium form of a cation exchange resin whereby said step (c) regenerates said resin to the potassium form, and wherein said step (d) of combining said potassium ion with said anion comprises eluting said potassium from said potassium form of said resin with a sodium salt solution containing said anion.

5. The process of claim 4 wherein said potassium-bearing salt solution is maintained at a temperature of about —10° to about 0° C. during said precipitation step.

6. The process of claim 4 wherein sodium perchlorate formed during said ion exchange is employed in said precipitation step.

7. The process of claim 6 wherein the sodium form of said ion exchange resin formed during said elution step is employed in said ion exchange step.

8. The process of claim 7 wherein said potassium-bearing salt solution is selected from the group consisting of a brine and a bittern and wherein said brine or bittern is maintained at a temperature of about —10° to about 0° C. during said precipitation step.

9. The process of claim 8 wherein the potassium salt solution formed during said elution step is evaporated to dryness to form a solid potassium salt.

References Cited

UNITED STATES PATENTS

| | | | |
|---|---|---|---|
| 1,338,235 | 4/1920 | McIlhiney | 23—39 |
| 1,716,663 | 6/1929 | Pike et al. | 23—38 |
| 2,619,404 | 11/1952 | Skogseid | 23—38 X |
| 2,900,223 | 8/1959 | Cunningham | 23—63 |
| 3,078,140 | 2/1963 | Hatch | 23—89 X |
| 3,096,153 | 7/1963 | Hadzeriga | 23—121 |

OSCAR R. VERTIZ, *Primary Examiner.*

G. T. OZAKI, *Assistant Examiner.*

U.S. Cl. X.R.

23—89, 102, 121; 210—24